United States Patent
Garmon et al.

(10) Patent No.: US 10,141,816 B2
(45) Date of Patent: Nov. 27, 2018

(54) METHOD OF ACHIEVING VARIABLE PERFORMANCE OF AN ELECTRIC GENERATOR

(71) Applicant: Siemens Energy, Inc., Orlando, FL (US)

(72) Inventors: Michael D. Garmon, Orlando, FL (US); Raul Ricardo Rico, Oviedo, FL (US); Bobby A. Warren, Fort Mill, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 294 days.

(21) Appl. No.: 14/938,382

(22) Filed: Nov. 11, 2015

(65) Prior Publication Data

US 2016/0211726 A1  Jul. 21, 2016

Related U.S. Application Data

(60) Provisional application No. 62/105,798, filed on Jan. 21, 2015.

(51) Int. Cl.
| | |
|---|---|
| *H02K 9/19* | (2006.01) |
| *H02K 9/197* | (2006.01) |
| *H02K 9/08* | (2006.01) |
| *H02K 5/12* | (2006.01) |
| *H02K 9/10* | (2006.01) |
| *H02P 8/36* | (2006.01) |
| *H02K 3/24* | (2006.01) |

(52) U.S. Cl.
CPC ............... *H02K 9/197* (2013.01); *H02K 5/12* (2013.01); *H02K 9/08* (2013.01); *H02K 9/10* (2013.01); *H02K 9/19* (2013.01); *H02P 8/36* (2013.01); *H02K 3/24* (2013.01); *H02K 2213/09* (2013.01)

(58) Field of Classification Search
CPC .................................. H02K 9/19; H02K 7/18
USPC ................... 310/52, 53, 55, 56, 66
See application file for complete search history.

(56) References Cited

U.S. PATENT DOCUMENTS

| | | |
|---|---|---|
| 3,816,751 A | 6/1974 | Jampen et al. |
| 5,028,378 A | 7/1991 | Wachholz et al. |
| 6,279,308 B1 * | 8/2001 | Sonoda ................. F01K 23/108 60/783 |
| 7,271,515 B2 | 9/2007 | Joho |
| 2005/0285458 A1 | 12/2005 | Moeleker et al. |

(Continued)

FOREIGN PATENT DOCUMENTS

| | | |
|---|---|---|
| EP | 2752578 A1 | 7/2014 |
| GB | 893847 A | 4/1962 |

*Primary Examiner* — Dang Le

(57) ABSTRACT

Disclosed is a method of operating a large electric generator, the generator having a rotor arranged along a centerline of the generator, a core arranged coaxially and surrounding the rotor; a plurality of stator windings arranged within the core; a stator frame arranged to fixedly support the core and rotationally support the rotor; a gas cooling system that circulates a cooling gas within the generator, the method steps including circulating a cooling liquid that cool the stator windings; sensing an output parameter of the generator; comparing via a control system the sensed output parameter of the generator to a predetermined scheme; and sending a control signal to an adjusting device in accordance with the control system comparison.

9 Claims, 4 Drawing Sheets

(56) References Cited

U.S. PATENT DOCUMENTS

| | | | |
|---|---|---|---|
| 2006/0057034 A1* | 3/2006 | Speranza | G05D 21/02 422/105 |
| 2008/0168794 A1* | 7/2008 | Cho | F25D 23/025 62/441 |
| 2008/0168796 A1 | 7/2008 | Masoudipour et al. | |
| 2010/0176670 A1* | 7/2010 | Gottfried | H02K 1/20 310/61 |
| 2011/0200460 A1* | 8/2011 | Nonaka | F04D 19/042 417/63 |
| 2013/0333393 A1* | 12/2013 | Jones | F02C 7/143 60/806 |
| 2014/0053567 A1 | 2/2014 | Langenbacher | |
| 2015/0145256 A1* | 5/2015 | Omoruyi | F01D 15/10 290/52 |

* cited by examiner

METHOD OF ACHIEVING VARIABLE PERFORMANCE OF AN ELECTRIC GENERATOR

CLAIM OF PRIORITY AND CROSS REFERENCE TO RELATED APPLICATIONS

The instant application claims benefit and priority to U.S. provisional application 62/105,798 filed on Jan. 21, 2015 and is incorporated herein in its entirety. Furthermore, this application is related to application Ser. Nos. 14/938,330; 14/938,313; 14/938,342 and 14/938,364 filed concurrently.

FIELD OF THE INVENTION

The present invention relates to high voltage power generation equipment and, more particularly, to a method of achieving variable performance of an electric generator.

BACKGROUND OF THE INVENTION

Dynamoelectric high-voltage machines and/or high-voltage systems, such as electrical generators in power plants, represent a substantial capital investment. Furthermore, it is desirable to avoid over-sizing in terms of the performance capability of the generator Due to the serious technical issues presented to the power generation industry due to part-load and varying-load operation, there is a significant need for a simple, low cost generator with a variable maximum efficiency/variable maximum out-put as well as a generator with reduced winding insulation thermal stresses and greater winding life.

SUMMARY OF THE INVENTION

One aspect is a method of operating a large electric generator, the generator having a rotor arranged along a centerline of the generator, a core arranged coaxially and surrounding the rotor; a plurality of stator windings arranged within the core; a stator frame arranged to fixedly support the core and rotationally support the rotor; a gas cooling system that circulates a cooling gas within the generator, the method steps comprising circulating a cooling liquid that cool the stator windings; sensing an output parameter of the generator; comparing via a control system the sensed output parameter of the generator to a predetermined scheme; and sending a control signal to an adjusting device in accordance with the control system comparison.

A further aspect includes further comprising the step of adjusting a pressurizing system in accordance with the control signal.

A further aspect includes the adjusting device permits the increase or decrease of cooling gas pressure via the pressurizing system.

A further aspect includes the adjusting device adjusts circulation of the cooling liquid.

A further aspect includes the adjusting device is a control valve.

A further aspect includes the cooling ability of the cooling gas is a function of the sensed output parameter of the generator.

A further aspect includes the predetermined scheme minimizes temperature fluctuations of the stator and rotor windings.

A further aspect includes the predetermined scheme minimizes thermal stresses of the stator and rotor windings.

A further aspect includes the predetermined scheme maximizes the efficiency of the generator.

A further aspect includes the predetermined scheme maximizes the power output of the generator.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
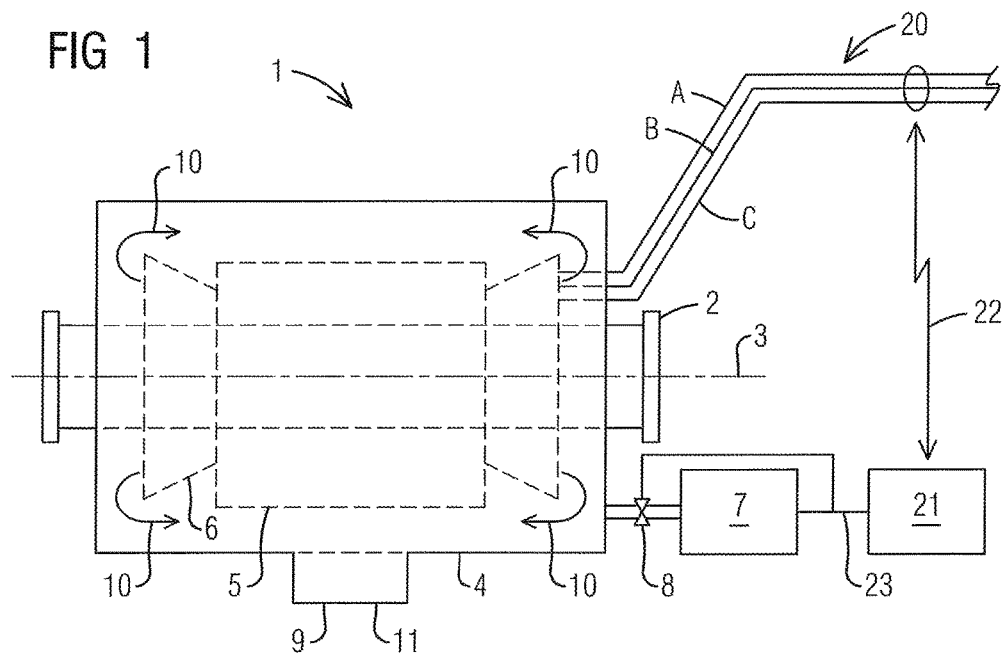
FIG. 1 depicts a gas cooled generator system, cooling gas pressurizing unit and associated control system.

In the following detailed description of the preferred embodiment, reference is made to the accompanying drawings that form a part hereof, and in which is shown by way of illustration, and not by way of limitation of the embodiment. It is to be understood that other embodiments may be utilized and that changes may be made without departing from the spirit and scope of this disclosure.

Currently, an electrical generator is configured or sized for the required maximum power output (MVA) which represents a particular physical configuration of the generator and an associated operating efficiency and cost to manufacture. However, modern power plants now see greater variation in required power output demand from the grid and associated operating conditions. In particular, one common variation modern power plants are experiencing is the requirement to operate at part-load conditions. For example, within the United States, generators do not typically operate at full load, rated power factor conditions. Instead, these generators typically operate approximately 80% of full load and at a variety of power factors. Part-load conditions can be any operating condition less than 100% power output. However, part-load operation typically is within the range of 20%-80% of maximum power output. Additionally, part-load conditions may be more specifically 60%-80% of maximum power output.

Furthermore, the state of the art of electric generator technology represents three primary configurations for cooling the generator rotor and stator, i) air cooling for both the rotor and stator, ii) hydrogen cooling for both the rotor and stator, and iii) water cooling for the stator coils and hydrogen cooling for the rotor and stator core. Air cooled electric generators are lower cost and mechanically less complex than hydrogen cooling and/or the combination of hydrogen and water cooling.

Advances in power plant prime mover power output capability have led to a demand for generator ratings that extend beyond the current capability of low-cost, conventional air-cooled units. Conventional air-cooled designs in the industry have generally been limited to approximately 350 MVA.

Typically, for applications above 350 MVA, a pressurized hydrogen-cooled generator is required. Although hydrogen is an excellent coolant, hydrogen-cooled generators are inherently more complex, more expensive to build and more expensive to operate than air-cooled generators due to the need to (i) prevent the mixing of hydrogen and air (i.e. complicated and expensive sealing systems and operating procedures) and (ii) the need to contain a potential hydrogen explosion within the generator (a very robust pressure vessel frame capable of containing the explosion pressure).

Furthermore, with the typical gas-cooled (air or hydrogen) generator, the cooling gas circuit is designed for 100% power output of the generator. However, when operating at part-load, the generator is not producing full power but the windage losses from the cooling gas circuit remain constant. Therefore, the generator and the power plant are operating at sub-optimal efficiency.

In addition to part-load operation, another common variation modern power plants are experiencing is the requirement to change load frequently. An issue associated with varying-load operation of the generator is large variations in operating temperatures of the stator and rotor windings due to the variations in power output to match the operational load demand. The variations in operating temperatures of the windings results in excessive thermal stress cycles of the winding components and premature aging of the insulation materials due to the change from one operating state of the generator to another, see FIG. 5.

Heat from traditional gas cooled generators is removed through convective heat transfer from the generator active components to the cooling gas. In the most simplistic terms, heat is primarily removed from generator components via convective heat transfer which is defined by:

$$Q=m*Cp*dTg. \quad \text{Eq. (1), and}$$

$$Q=h*A*dTs, \text{ where } h \text{ is } f(m,k) \quad \text{Eq. (2).}$$

As can be seen by examination of Eq. (1) above, heat to be removed from the generator (Q) can be increased by increasing cooling gas mass flow rate (m), cooling gas specific heat (Cp), and/or the cooling gas temperature rise along the flow-path (dTg). Eq. (2) shows that Q can also be increased by increasing the heat transfer coefficient (h) as well as the temperature differential between the component temperature and the cooling gas (dTs). Furthermore, the heat transfer coefficient is a direct function of m and gas thermal conductivity (k). Heat transfer can also be increased by increasing the surface area (A) of the component to be cooled, but this is typically constrained by other design criteria. Increasing the cooling gas pressure from 0 to 1 bar gage effectively doubles m and therefore the cooling capacity of the gas. The dTs is typically limited by the material properties used in the construction of the generator components. However, dTs is generally maximized while meeting design requirements such as low and high cycle fatigue life and acceptable thermal stresses. The Cp and k are dependent on the selected cooling gas chemistry. Typically, Cp and k are greater for lighter gases like hydrogen or helium, and less for heavy gases such as air, molecular nitrogen or carbon dioxide. Historically, generator designs have tried to optimize heat removal through the optimal selection of Cp and k of the cooling gas along with the cooling gas density by determining a fixed operating gas pressure.

It can be observed that the largest benefit from pressurization occurs from 0 bar gauge to 1 bar gauge pressure, i.e. a doubling of cooling gas pressure results in a doubling of the heat transfer capacity of the cooling gas. Increased benefit due to higher pressurization diminishes as the cooling gas pressure increases above 1 bar gauge pressure. However, further pressurization to approximately 2 bar gauge pressure may still provide acceptable heat transfer and performance gains. However, the drawback of increased pressurization is increased fluid pumping losses (known as windage) due to the increased density of the cooling gas.

The positive and negative impacts of cooling gas pressurization must be balanced to obtain an optimal configuration. Gas pressurization increases heat removal capacity, but also increases the heat generation through windage/friction and therefore reduces efficiency of the generator.

Referring to FIG. 1, an embodiment provides a gas cooled generator 1. The generator 1 includes a rotor 2 arranged along a centerline 3 of the generator 1. The generator further includes a stator core 5 arranged coaxially with the rotor 2 and at least partially surrounds the rotor 2.

Figure 2:
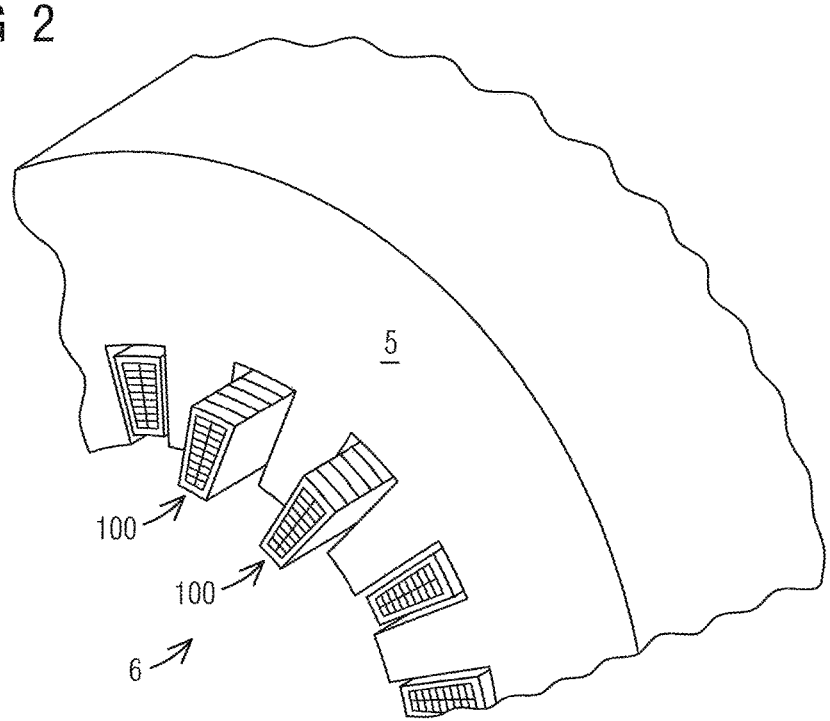
FIG. 2 is depicts a stator core and a winding coil residing within the core.
Figure 3:
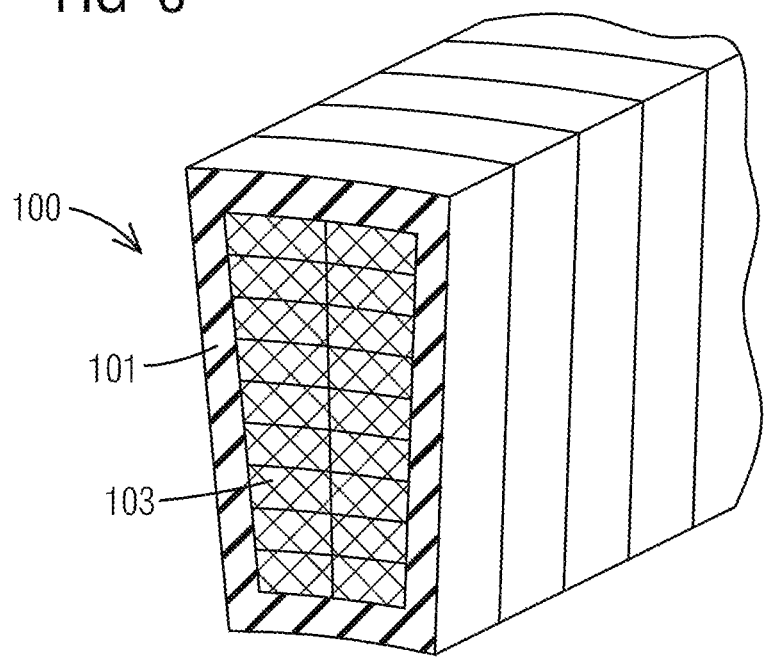
FIG. 3 depicts an insulated coil.

As can be seen in FIGS. 2 and 3, the stator core 5 supports a plurality of electrical conducting coils 100. The plurality of coils 100 are commonly known within the power generation industry as windings 6. The coil 100 typically consist of electrical conductors 103 surrounded by electrical insulation 101 to electrically isolate the electrical conductors from the stator core 5 and other surrounding components of the generator 1. One of ordinary skill in the art of electrical generator design can readily appreciate that there are several common schemes for cooling the windings 6.

Figure 4:
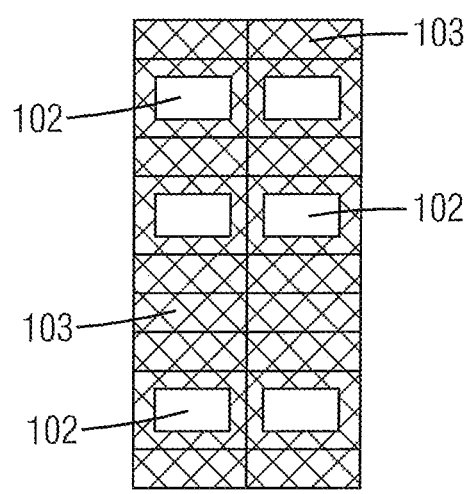
FIG. 4 depicts an end view of coil showing the conductors.

For example, as can be seen in FIGS. 2, 3 and 4, coil 100 can be cooled indirectly by conductive heat transfer to the stator core 5. That is, the winding 6 is not cooled directly by a cooling medium. Rather, the heat generated within the coil 100 due to operation is conducted to the stator core 5 and the stator core 5 is then cooled by a cooling medium.

In a further example, and as can be seen in FIG. 4, another means of cooling the coil 100 is direct cooling, where cooling passages 102 are formed within or adjacent to the coil 100 itself. The cooling passages 102 can be formed integrally with and as an electrical conductor 103 or the cooling passages 102 can be formed discretely from the electrical conductor 103 as a separate component.

Referring again to FIG. 1, the embodiment further provides a low pressure pressurizing unit 7 configured to vary an operating pressure of a non-explosive cooling gas 10 typically between atmospheric pressure (0 bar gauge) and 1 to 2 bar above atmospheric (1 to 2 bar gauge) as determined by control system 21. The pressurizing unit 7 may incorporate a compressor to pressurize the cooling gas, a pressure reservoir to store a large volume of compressed gas to facilitate the rapid pressurization of the generator 1 as determined by the control system 21, and an adjusting device 8 where the adjusting device 8 may be a control valve. Furthermore, the compressor could be a standalone device or could be represented an extraction of compressed gas from another device like a gas turbine compressor or steam turbine.

The control system 21 continuously senses a state of the power output of the generator to the electrical grid 22. The control system 21 may sense the load on the generator 1 from typical control room signals, for example, such as terminal voltage, phase current demand, and power factor. The control system 21 then compares the sensed generator output signal 22 to the load demand of the generator 1 and determines an optimum pressure of the cooling gas 10 based on a predetermined control scheme. Once the optimum pressure of the cooling gas 10 is determined by the control system 21 in conjunction with the predetermined scheme, a control signal 23 is generated by the control system 21 and transmitted to the pressurizing unit 7. The pressurizing unit 7 then adjusts the operating pressure of the cooling gas 10 in accordance with the control signal 23. The pressure control scheme can be customized to maximize generator efficiency.

Figure 5:
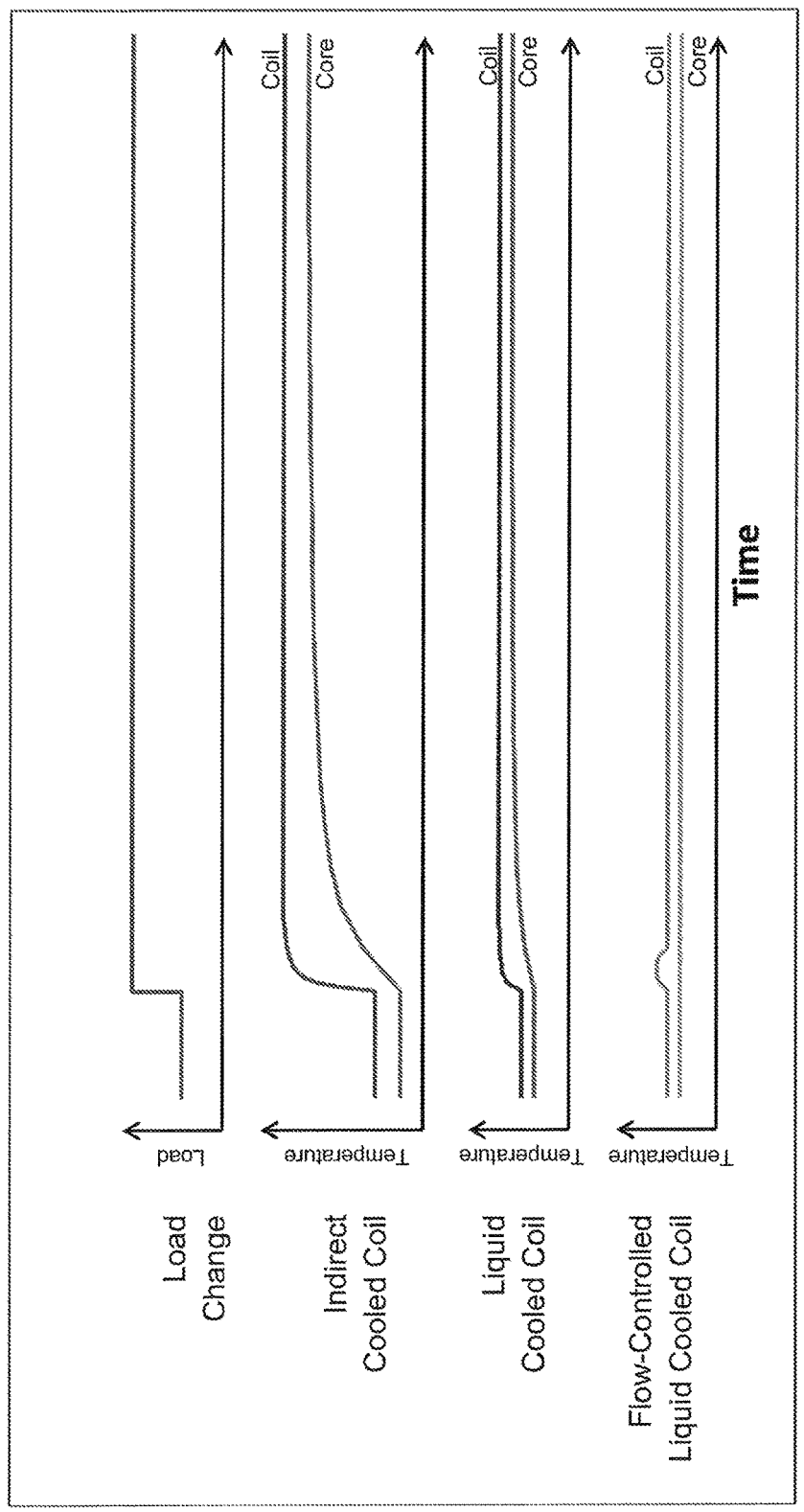
FIG. 5 depicts various coil thermal responses due to a step change in generator load.

A further aspect may utilize liquid cooling of the stator coil 100 to provide additional operational flexibility, improved efficiency and reliability of the coil 100, see FIGS. 4 and 5. The combination of direct liquid cooling of the stator coils 100 with low pressure non-explosive gas cooling of the stator core 5 and the rotor 2 results in greater operational flexibility and efficiency of the generator 1. Liquid cooling of the stator coils 100 eliminates the heat load from the stator coils 100 on the cooling gas 10 which thereby reduces the heat demand on the overall cooling gas system (i.e. cooling unit 9, cooling gas 10, blower 11 and pressurizing unit 7). Therefore, the losses due to the gas cooling system can be minimized.

Additionally, the control system 21 may further control the pressurizing unit 7 along with the liquid cooling of the stator coils 100 to regulate the generator component temperatures in accordance with the predetermined scheme to minimize thermally induced stresses of the various components like the stator coils 100 and rotor 2, so as to maximize the life of the low pressure non-explosive gas generator 1 in environments where load cycling is excessive, see FIG. 5.

A further aspect utilizes a pressure boundary member 4 to contain the pressure of the cooling gas 10. The pressure boundary member 4 may be formed as a frame from thin plate material or as a semi-flexible pressure containment device formed from film or fabric, all of which may be made from a polymer, metallic or composite materials of sufficient construction to withstand the operating environment of the generator, i.e. temperature, pressure, vibration and environmental considerations. Typically, metallic thin plate material utilized for the low pressure frame or pressure boundary member 4 may be between approximately 5 mm and 15 mm thick and film or fabric may be between approximately 1 mm and 5 mm thick. Typical hydrogen cooled generators have much thicker steel walled frames due to the fact that the hydrogen cooling gas pressure is typically 3 to 5 bar gauge pressure, as well as the frame must be strong enough to contain the internal pressure due to an explosion of the hydrogen cooling gas. In order for the typical hydrogen cooled generator frame to contain the pressure for an internal explosion of hydrogen cooling gas, the frame walls are typically approximately 19 mm to 51 mm thick. The present frame or pressure boundary 4 is intended only to withstand the relatively low pressure of 1 to 2 bar gauge pressure and due to the non-explosive nature of the cooling gas; the frame 4 does not have to contain explosion pressures. Therefore, the low pressure frame need 4 only be sized and configured to meet the operating conditions of a non-explosive cooling gas low pressure generator and not the explosion pressures resulting in a structurally thinner frame or pressure boundary member 4.

Additionally, through the benefit of low pressure gas cooling to a maximum of 1 to 2 bar gauge pressure, the entire generator can be sized much smaller than an equivalent output traditional air cooled generator. For example, the present low pressure non-explosive gas generator 1 can be smaller in physical size than present air cooled generators by 10 to 35%. Preferably, the present low pressure non-explosive gas generator 1 could be 35% smaller in physical size than a typical air cooled generator, or alternatively, the present low pressure non-explosive gas generator 1 could achieve a 50% to 60% increase in power output compared to a typical air cooled generator of the same size or physical dimensions.

Figure 6:
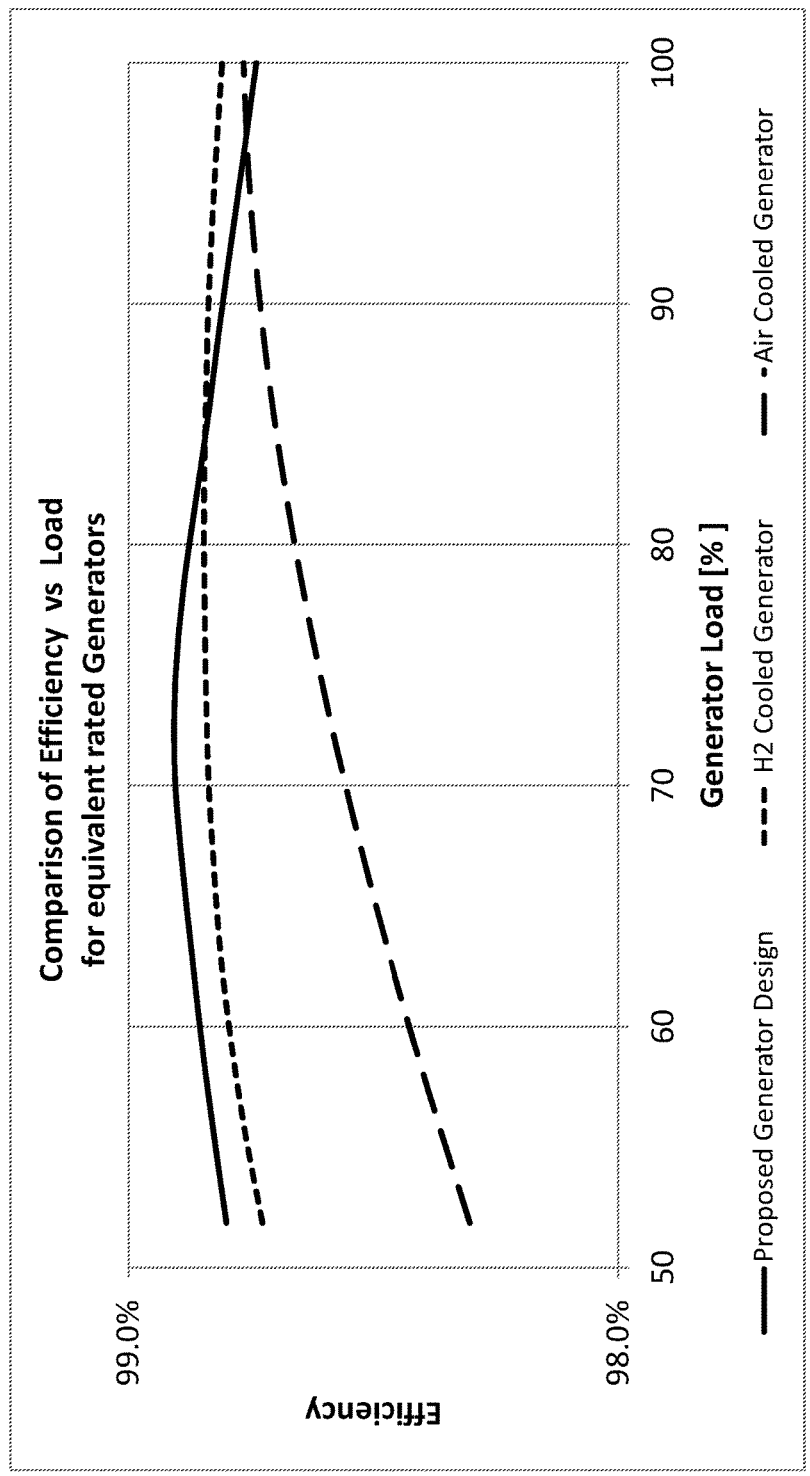
FIG. 6 depicts comparison of efficiency vs. load for equivalent rated generators.

Furthermore, if the power output demands of the generator exceed the power output limits of the generator 1, the cooling gas pressure can be quickly and easily increased up to 1 bar gauge pressure and furthermore to a maximum of 2 bar gauge pressure for additional generator power output capacity. For example, by varying gas pressure between 0 and 1 bar gauge, an increase of approximately 50% of additional power output capability with no other modification required to the generator 1, see FIG. 6.

Furthermore, the cooling system of the low pressure non-explosive gas generator 1 is physically smaller than that of a typical air cooled generator due to the combination of pressurized air cooling and a water-cooled stator winding. Therefore, the windage losses for the low pressure non-explosive gas generator 1 are greatly reduced as compared to an equivalent power output traditional air cooled generator. At power outputs less than 100% rated output, the cooling gas pressure of the low pressure non-explosive gas generator 1 can be reduced to obtain the overall efficiencies that improve at partial load, see FIG. 6.

In a further aspect, the low pressure non-explosive gas generator 1 may utilize alternate gasses as the cooling medium. Such gases are listed in Table 1 below.

TABLE 1

| Refrigerant Number | Name |
|---|---|
| — | Air |
| R-704 | Helium |
| R-702 | Hydrogen |
| R-720 | Neon |
| R-728 | Nitrogen |
| R-740 | Argon |
| R-134a | Tetrafluoroethane |
| R-152a | Difluoroethane |
| R-717 | Ammonia |
| R-744 | Carbon Dioxide |

Additionally, the gasses identified in Table 1 may also be mixed in various combinations to provide specific performance characteristics.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of operating a large electric generator, the generator having a rotor arranged along a centerline of the generator, a core arranged coaxially and surrounding the rotor; a plurality of stator windings arranged within the core; a stator frame arranged to fixedly support the core and rotationally support the rotor; a gas cooling system that circulates a cooling gas within the generator, the method steps comprising:
circulating a cooling liquid that cool the stator windings;
sensing an output parameter of the generator;
comparing via a control system the sensed output parameter of the generator to a predetermined scheme;

sending a control signal to an adjusting device in accordance with the control system comparison; and
adjusting a pressurizing system in accordance with the control signal.

2. The method of claim 1, wherein the adjusting device permits the increase or decrease of cooling gas pressure via the pressurizing system.

3. The method of claim 1, wherein the adjusting device adjusts circulation of the cooling liquid.

4. The method of claim 1, wherein the adjusting device is a control valve.

5. The method of claim 1, wherein the cooling ability of the cooling gas is a function of the sensed output parameter of the generator.

6. The method of claim 1, wherein the predetermined scheme minimizes temperature fluctuations of the stator and rotor windings.

7. The method of claim 1, wherein the predetermined scheme minimizes thermal stresses of the stator and rotor windings.

8. The method of claim 1, wherein the predetermined scheme maximizes the efficiency of the generator.

9. The method of claim 1, wherein the predetermined scheme maximizes the power output of the generator.

* * * * *